US012253820B2

(12) United States Patent
Toyoda et al.

(10) Patent No.: US 12,253,820 B2
(45) Date of Patent: Mar. 18, 2025

(54) APPARATUS INCLUDING AN EXTIOR COVER TO OPEN AND CLOSE A POWDER COLLECTION CONTAINER

(71) Applicants: Minoru Toyoda, Kanagawa (JP); Kentaro Nodera, Kanagawa (JP)

(72) Inventors: Minoru Toyoda, Kanagawa (JP); Kentaro Nodera, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/223,556

(22) Filed: Jul. 19, 2023

(65) Prior Publication Data

US 2024/0027949 A1 Jan. 25, 2024

(30) Foreign Application Priority Data

Jul. 22, 2022 (JP) ................................ 2022-116900
Apr. 7, 2023 (JP) ................................ 2023-062625

(51) Int. Cl.
*G03G 21/12* (2006.01)
*G03G 21/10* (2006.01)

(52) U.S. Cl.
CPC ........... *G03G 21/12* (2013.01); *G03G 21/105* (2013.01); *G03G 2221/1624* (2013.01)

(58) Field of Classification Search
CPC ................. G03G 21/12; G03G 21/105; G03G 2221/1624
See application file for complete search history.

(56) References Cited

U.S. PATENT DOCUMENTS 6,141,513 A * 10/2000 Nishiuwatoko ... B29C 45/14344 399/119
6,298,885 B1 * 10/2001 Yoshino ............. G03G 15/0874 141/369
2009/0022532 A1 * 1/2009 Fukunaga .............. G03G 21/12 399/360
2009/0220257 A1 * 9/2009 Tsusaka ................. G03G 21/12 399/35
2010/0111558 A1 * 5/2010 Berg ...................... G03G 21/12 399/101
2011/0085835 A1 * 4/2011 Sato ....................... G03G 21/12 399/360
2015/0261172 A1 9/2015 Karasawa et al.
2017/0023908 A1 * 1/2017 Miura .................. G03G 21/105

FOREIGN PATENT DOCUMENTS

JP 2006-195492 7/2006
JP 2009-063618 3/2009
KR 20080061426 A * 7/2008

* cited by examiner

*Primary Examiner* — Arlene Heredia
*Assistant Examiner* — Laura Roth
(74) *Attorney, Agent, or Firm* — XSENSUS LLP

(57) ABSTRACT

A powder collection container that is attachable to and detachable from a mount part of an apparatus and stores powder includes a plurality of walls that form a storage space to store the powder. The plurality of walls include a first wall that faces the mount part of the apparatus and a second wall that does not to face the mount part of the apparatus. A thickness of the first wall is smaller than a thickness of the second wall.

16 Claims, 15 Drawing Sheets

APPARATUS INCLUDING AN EXTIOR COVER TO OPEN AND CLOSE A POWDER COLLECTION CONTAINER

CROSS-REFERENCE TO RELATED APPLICATIONS

This patent application is based on and claims priority pursuant to 35 U.S.C. § 119(a) to Japanese Patent Application Nos. 2022-116900, filed on Jul. 22, 2022, and 2023-062625, filed on Apr. 7, 2023 in the Japan Patent Office, the entire disclosure of which is hereby incorporated by reference herein.

BACKGROUND

Technical Field

Embodiments of the present disclosure relate to a powder container, an apparatus, and an image forming apparatus.

Related Art

In an image forming apparatus such as a printer using an electrophotographic method, residual toner (remaining toner) that is toner remaining on a photoconductor or a transfer unit is cleaned by a cleaning mechanism, and then, is collected as waste toner. Such waste toner is stored in a waste-toner collection container disposed in the image forming apparatus, is collected after reaching a specified amount, and is subjected to disposal or other processing.

SUMMARY

In an embodiment of the present disclosure, there is provided a powder collection container that is attachable to and detachable from a mount part of an apparatus, stores powder, and includes a plurality of walls that form a storage space to store the powder. The plurality of walls include a first wall that faces the mount part of the apparatus and a second wall that does not to face the mount part of the apparatus. A thickness of the first wall is smaller than a thickness of the second wall.

In another embodiment of the present disclosure, there is provided an apparatus that includes the powder collection container.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 1A and 11B are diagrams illustrating a fixing method of a waste-toner collection container according to an embodiment of the present disclosure;

Figure 1:
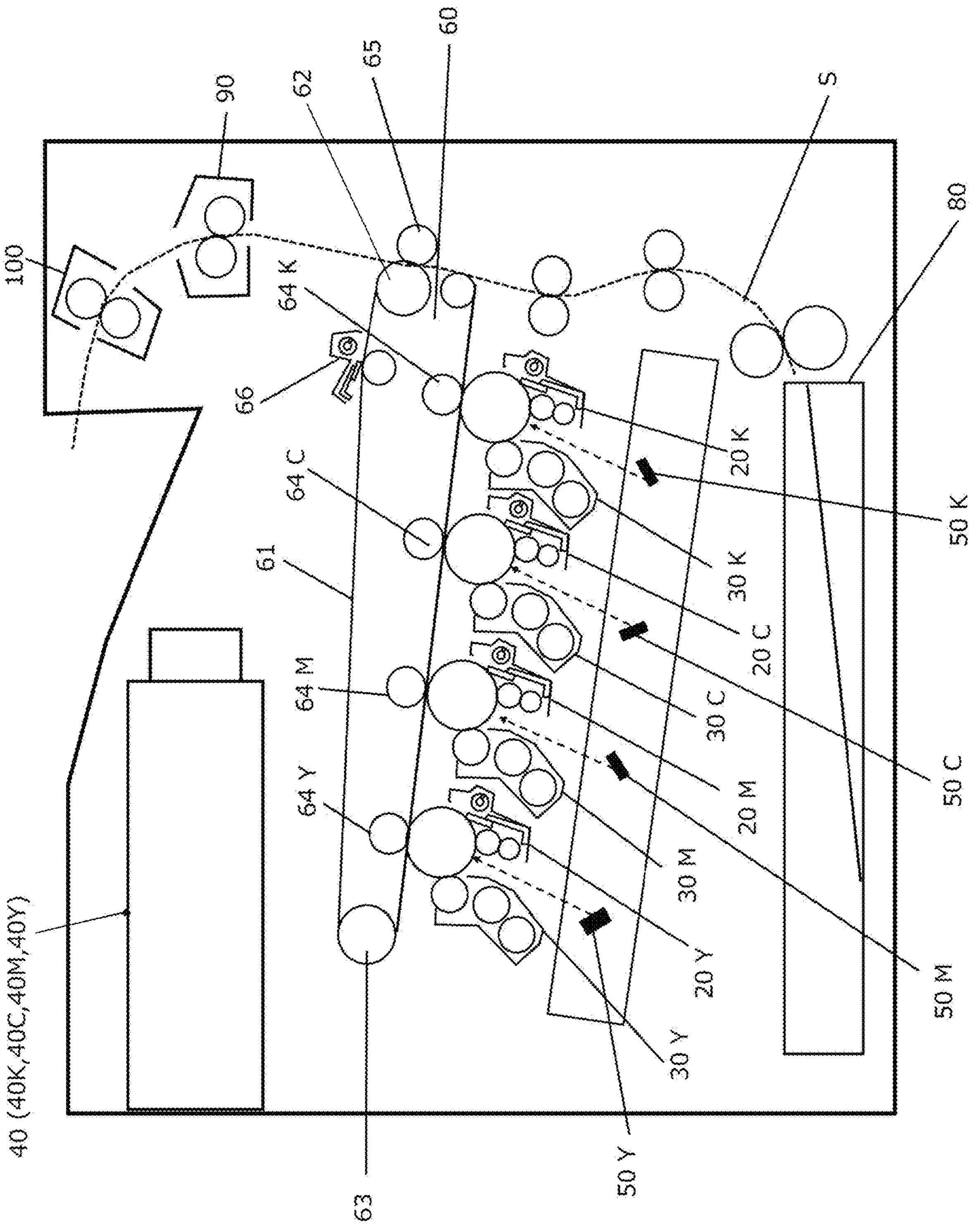
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 illustrates a configuration of an electrophotographic image forming apparatus according to an embodiment of the present disclosure. FIG. 1 is a cross-sectional view of a color image forming apparatus 10 in which four image forming devices are arranged. In each of the image forming devices, one developing unit is disposed on the circumferential surface of a photoconductor, and an intermediate transfer unit is disposed above the photoconductor and the developing unit. The image forming apparatus 10 is an example of an apparatus. FIG. 1 also illustrates a state where the developing unit and a photoconductor unit are attached to a body of the image forming apparatus 10. A description is given of a main part of the color image forming apparatus with reference to FIG. 1.

Four toner bottles 40K, 40C, 40M, and 40Y, which may be collectively referred to as toner bottle(s) 40 unless distinguished, containing toners of different colors are arranged horizontally in order of black (K), cyan (C), magenta (M), and yellow (Y) from the front side to the back side of the image forming apparatus 10 (e.g., from the right side to the left side in FIG. 1). Toners are conveyed from the toner bottles 40K, 40C, 40M, and 40Y to developing units 30K, 30C, 30M, and 30Y, which may be referred to as developing unit(s) 30 unless distinguished, respectively. Photoconductor units 20K, 20C, 20M, and 20Y, which may be collectively referred to as photoconductor unit(s) 20 unless distinguished, are disposed as units combined with the developing units 30K, 30C, 30M, and 30Y, respectively.

Cleaning blades 23K. 23C, 23M, and 23Y, which may be collectively referred to as charging unit(s) 23 unless distinguished, for scraping off untransferred toner after a primary transfer process and charging rollers 22K. 22C, 22M, and 22Y, which may be collectively referred to as charging roller(s) 23 unless distinguished, in contact with photoconductors 21 are disposed around the photoconductors 21 of the photoconductor units 20K, 20C, 20M, and 20Y, respectively. An exposure device 50K, 50C. 50M, or 50Y, which may be collectively referred to as exposure device 50 unless distinguished, that exposes the surface of the photoconductor 21 with light is disposed around the photoconductor 21.

An intermediate transfer unit 60 is configured such that an intermediate transfer belt 61 that contacts and separates from the photoconductor 21 is stretched around a drive roller 62, a driven roller 63, and primary transfer rollers 64K, 64C, 64M, and 64Y, which may be collectively referred to as primary transfer roller(s) 64 unless distinguished, and moves circularly.

Each developing unit 30 includes a developing roller 31. A bias voltage of a negative potential is applied to the core metal of the developing roller 31 from a bias power source. A direct-current negative potential bias voltage is applied to each charging roller 22 from another bias power source.

Figure 2:
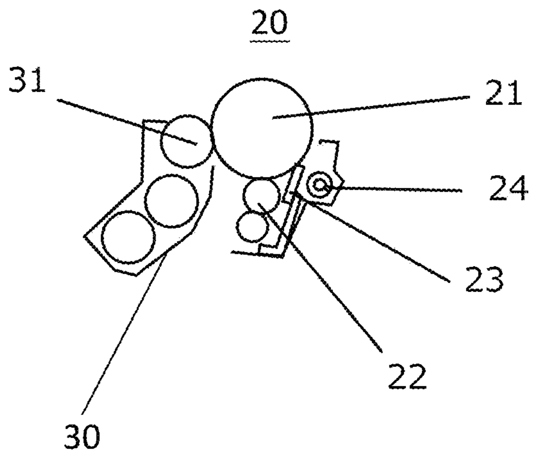
FIG. 2 is a schematic view of a photoconductor unit and a developing unit included in the image forming apparatus of FIG. 1.

The image forming apparatus 10 includes the four photoconductor units 20. Each photoconductor unit 20 includes the photoconductor 21 combined as a unit with the developing unit 30, the cleaning blade 23 that contacts the photoconductor 21, and the charging roller 22. FIG. 2 is a schematic view of a combined configuration of the photoconductor unit 20 and the developing unit 30. The color of yellow is described as an example. The other colors (black, cyan, and magenta) have the same configuration.

A description is given of a collecting method for residual toner (remaining toner) with reference to the photoconductor unit 20Y as an example. The collecting method is the same for the other photoconductor units 20K, 20C, and 20M. First, residual toner remaining on the photoconductor 21 is scraped off by the cleaning blade 23 as a cleaner with rotation of the photoconductor 21, and is conveyed from the photoconductor unit 20 to a waste-toner collection container 70 by a conveyor 24. Residual toner remaining on the intermediate transfer belt 61 (untransferred toner) is also collected by an intermediate transfer cleaning unit 66, and then, is conveyed to the waste-toner collection container 70 to be described below. The residual toner is stored in the waste-toner collection container 70 and is subjected to processing such as disposal as waste toner. Details of the waste-toner collection container 70 are described below.

A description is given of an image forming method, returning to FIG. 1 again. In the photoconductor unit 20 of the color Y, the charging roller 22Y uniformly charges the cleaned circumferential surface of a photoconductor 21Y to high potential to initialize the surface of the photoconductor 21Y. An exposure device 50Y exposes the charged photoconductor 21 selectively based on image data. As a result, an electrostatic latent image is formed that includes a low potential portion where the surface potential of the photoconductor 21 has been decayed by the exposure and a high potential portion due to the uniform initialization charging.

A developing roller 31Y of the developing unit 30Y transfers toner to the low potential portion of the electrostatic latent image on the photoconductor 21 to form (develop) a toner image. The photoconductor 21Y rotates and conveys the toner image to transfer the toner image onto the intermediate transfer belt 61.

After that, the toner image on the intermediate transfer belt 61 comes to a contact portion with a photoconductor 21M. The toner image of magenta color formed in the photoconductor unit 20M is superimposed and transferred onto the toner image of yellow color on the intermediate transfer belt 61. Subsequently, the same operation is performed in the photoconductor unit 20C of the cyan color and the photoconductor unit 20K of the K color. As a result, the toner images of four colors that are superimposed one on another are conveyed, and then transferred by a secondary transfer roller 65 onto a sheet S conveyed from a sheet feeder 80.

After that, the sheet S on which the toner images are transferred passes a fixing unit 90. The toner images are fixed on the sheet S by application of heat and pressure at the time. As a result, the sheet S on which the toner images are fixed passes a sheet ejection unit 100 and is ejected to a sheet ejector of a body of the image forming apparatus 10.

Figure 3A:
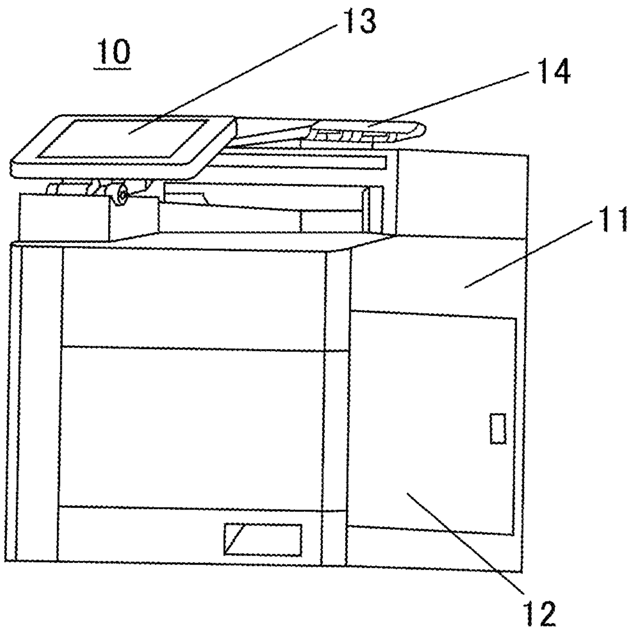
FIGS. 3A and 3B are views of an entire appearance of the image forming apparatus of FIG. 1.
Figure 3B:
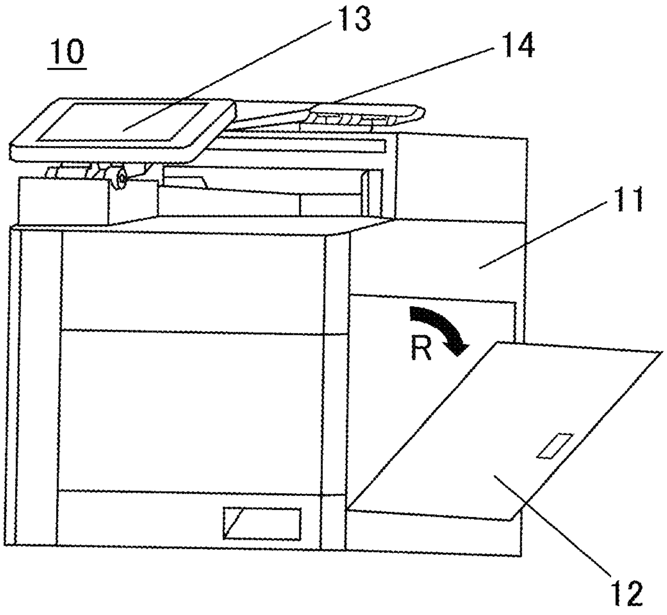
Figure 4A:
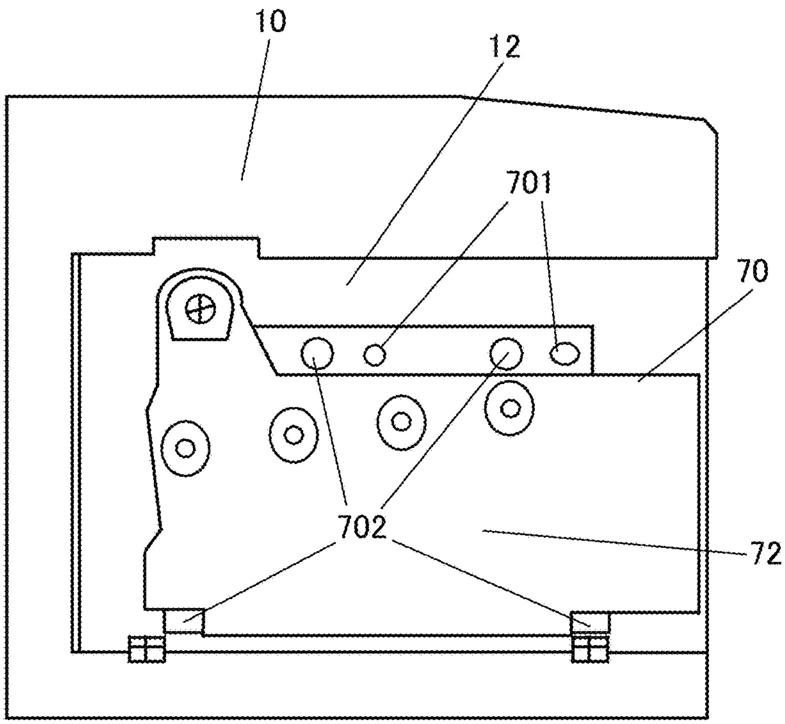
FIGS. 4A and 4B are diagrams illustrating a waste-toner collection container attached to an exterior cover of the image forming apparatus of FIG. 1.
Figure 4B:
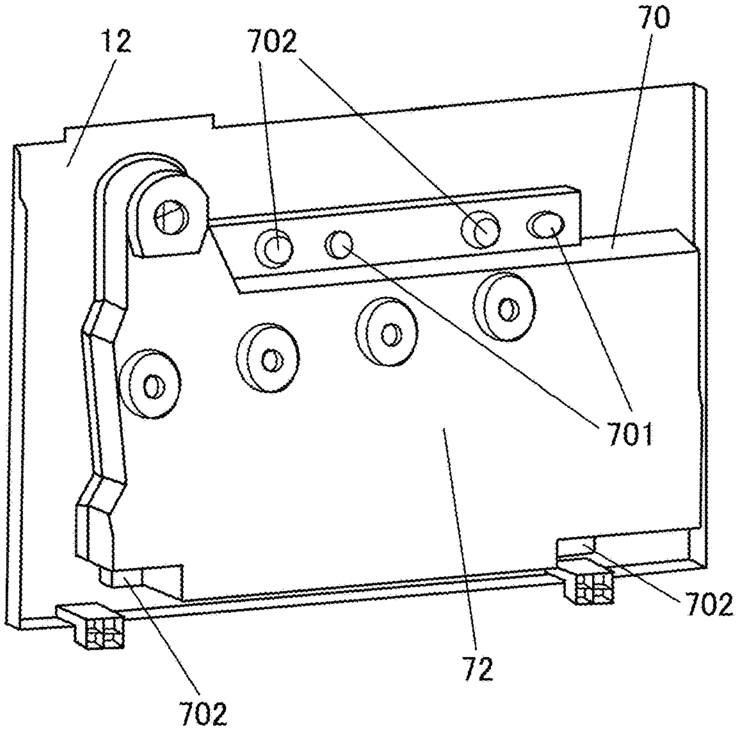

FIG. 3A is a diagram illustrating the entire appearance of an image forming apparatus according to the present embodiment. FIG. 3B is a diagram illustrating opening of an exterior cover with respect to the body of the image forming apparatus. FIG. 4A is a plan view of a waste-toner collection container attached to the exterior cover of an image forming apparatus. FIG. 4B is a perspective view of the waste-toner collection container attached to the exterior cover of the image forming apparatus.

As illustrated in FIG. 3A, the image forming apparatus 10 is provided with an operation panel 13. When a user performs printing, a user operates the operation panel 13 to execute, for example, the printing operation in the image forming apparatus 10. The image forming apparatus 10 is also provided with an automatic document feeder (ADF) 14 for copying or reading a document.

As illustrated in FIG. 4A, the image forming apparatus 10 includes the waste-toner collection container 70 that is a powder container for collecting residual toner remaining on the photoconductor 21 and the intermediate transfer belt 61 as waste toner. The waste-toner collection container 70 is attached to a cover located on the right side when viewed from the front side (the side on which a user operates the operation panel) of the image forming apparatus 10 in FIG. 3A. The cover is formed of resin in the present embodiment and has a configuration including two members of a fixed cover 11 that is fixed to the image forming apparatus 10 and an exterior cover 12 that is openable and closable like a door. As illustrated in FIG. 3B, the exterior cover 12 is opened downward as indicated by an arrow R and closed upward with a hinge located at a lower portion of the exterior cover 12 as an axis. As illustrated in FIGS. 4A and 4B, the waste-toner collection container 70 is removably attached to the exterior cover 12. For example, when the waste-toner collection container 70 is filled with waste toner and an operator replaces the waste-toner collection container 70, the exterior cover 12 is opened and the waste-toner collection container 70 appears. As a result, the waste-toner collection container 70 can be removed from the exterior cover 12.

Depending on an image forming apparatus, a transfer unit and an image forming unit cannot be accessed unless a waste-toner collection container is removed. For example, when the transfer unit and the image forming unit are replaced, the transfer unit and the image forming unit may not be removable unless the waste-toner collection container is removed. On the other hand, since the waste-toner collection container 70 is attached to the exterior cover 12 as described above in the present embodiment, only opening and closing the exterior cover 12 causes the waste-toner collection container 70 to retract, thus allowing an operator to access a transfer unit and an image forming unit.

Figure 5:
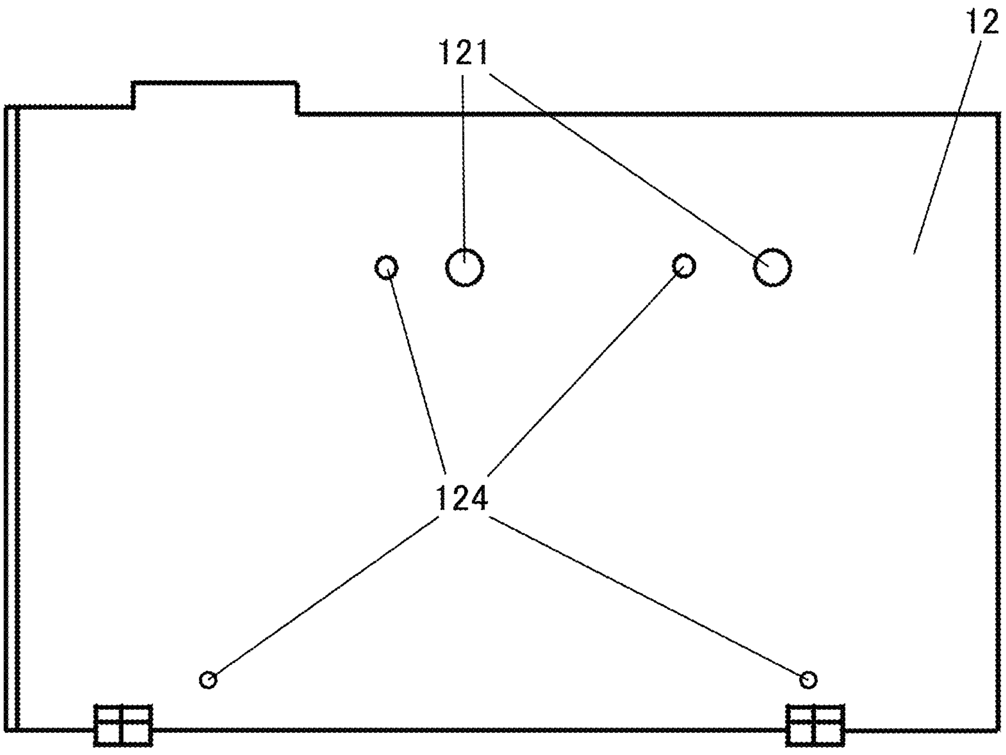
FIG. 5 is a diagram illustrating the entire exterior cover of FIGS. 4A and 4B.

FIG. 5 is a schematic view of the entire exterior cover 12. The exterior cover 12 is an example of a mount part (a part to and from which a powder collection container is to be attached and detached. The mount part of the apparatus is a part of the apparatus that faces a first wall (a wall formed by a film-shaped member 73 in the present embodiment) forming a space for storing powder in the powder container. In the present embodiment, a part of the waste-toner collection container 70 that faces the film-shaped member 73 in a state where the waste-toner collection container 70 is attached to the exterior cover 12 corresponds to the mount part. The waste-toner collection container 70 has holes 701 that engage with projections 121 on the exterior cover 12. The holes 701 and the projections 121 are engaged with each other, so that the position of the waste-toner collection container 70 relative to the exterior cover 12 is determined.

The waste-toner collection container 70 also has fasteners 702 in which screws are fastened in screw holes 124 of the exterior cover 12. The fastener 702 is an example of an attaching-and-detaching member. The waste-toner collection container 70 is fixed to the exterior cover 12 by the screws at the fasteners 702. The fixing method is exemplified by screw fastening. However, the present disclosure is not limited thereto, and may be, for example, snap-fit.

Figure 6A:
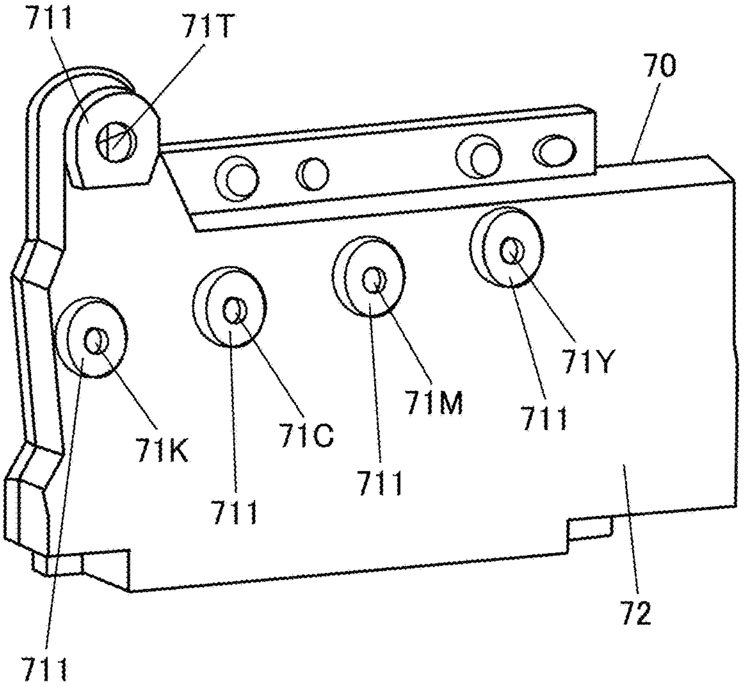
FIGS. 6A and 6B are perspective views of an appearance of the waste-toner collection container of FIGS. 4A and 4B.
Figure 6B:
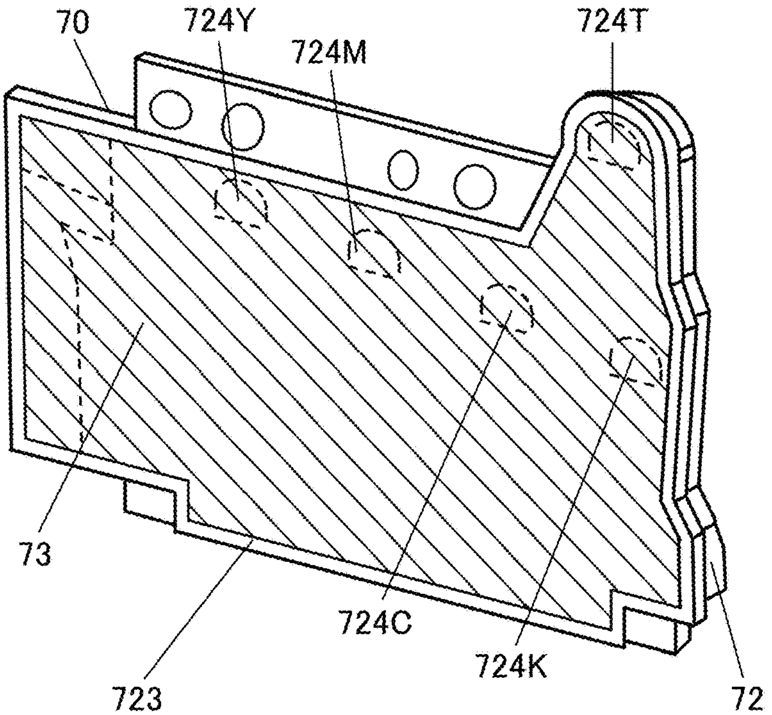

FIGS. 6A and 6B are perspective views of the appearance of the waste-toner collection container 70 in the present embodiment. FIG. 6A is a perspective view of the waste-toner collection container 70 when viewed from a case 72. FIG. 6B is a perspective view of the waste-toner collection container 70 when viewed from the film-shaped member 73. First, a description is given of the waste-toner collection container 70 according to the present embodiment with reference to FIGS. 6A and 6B.

The waste-toner collection container 70 is a storage case that includes the case 72 and the film-shaped member 73 and stores waste toner. The case 72 is an example of a second wall. The film-shaped 73 is an example of the first wall. The film-shaped member 73 is indicated by shaded hatching in FIG. 6B. The case 72 and the film-shaped member 73, which are walls, form a space for storing waste toner. The waste-toner collection container 70 has holes 71K, 71C, 71M, and 71Y, which may be referred to as hole(s) 71 unless distinguished, serving as inlet ports for residual toner corresponding to the photoconductor units 20K, 20C, 20M, and 20Y, respectively. Similarly to the photoconductor unit 20, the residual toner collected by the intermediate transfer cleaning unit 66 is delivered from a hole 71T. In order to prevent toner scattering and toner leakage from the inlet ports, sealing members 711 are attached to the holes 71 such that the sealing members 711 do not interfere with the inlet ports. For example, a sponge is used as the sealing member 711. Details of the waste-toner collection container 70 are described below.

Figure 7A:
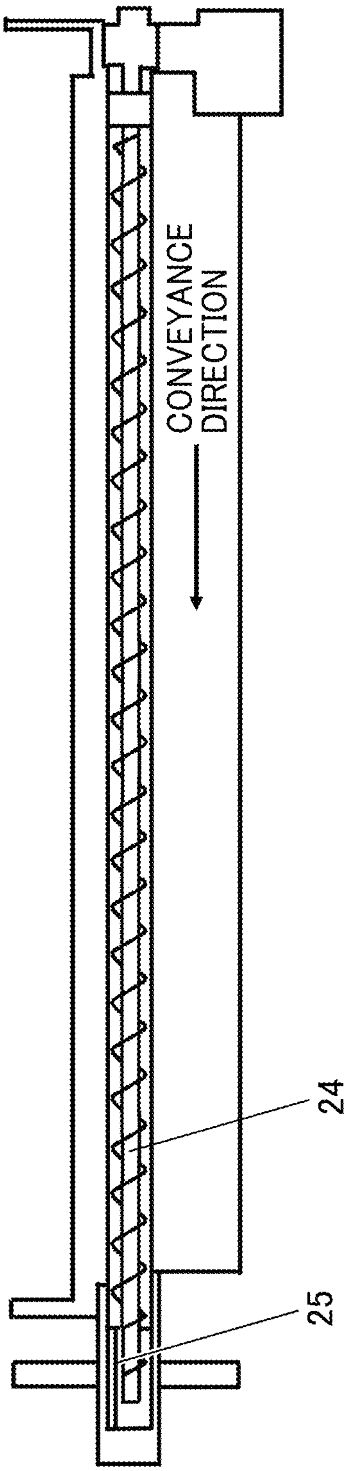
FIGS. 7A to 7D are diagrams illustrating a collecting method of residual toner, according to an embodiment of the present disclosure.
Figure 7B:
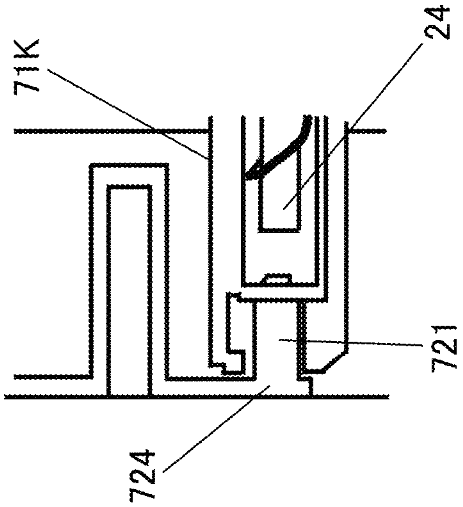
Figure 7C:
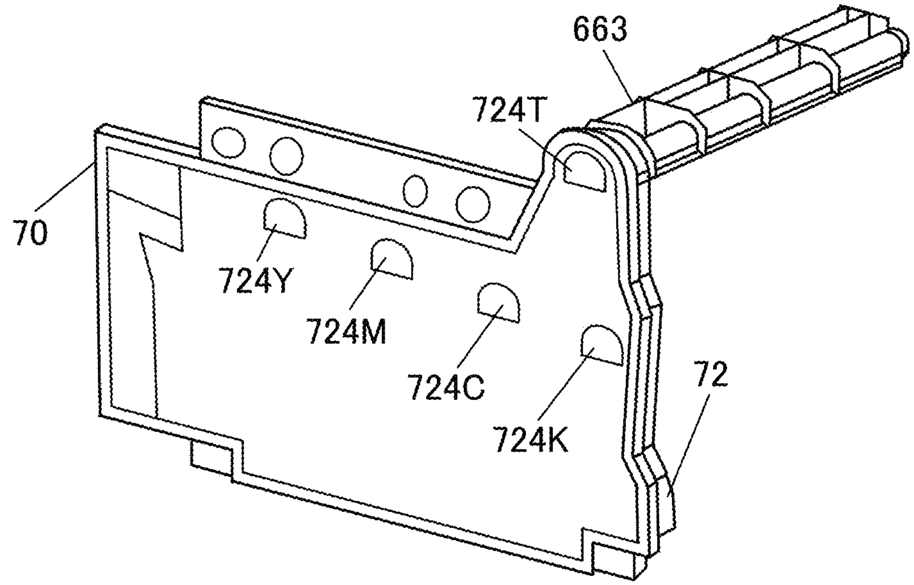
Figure 7D:
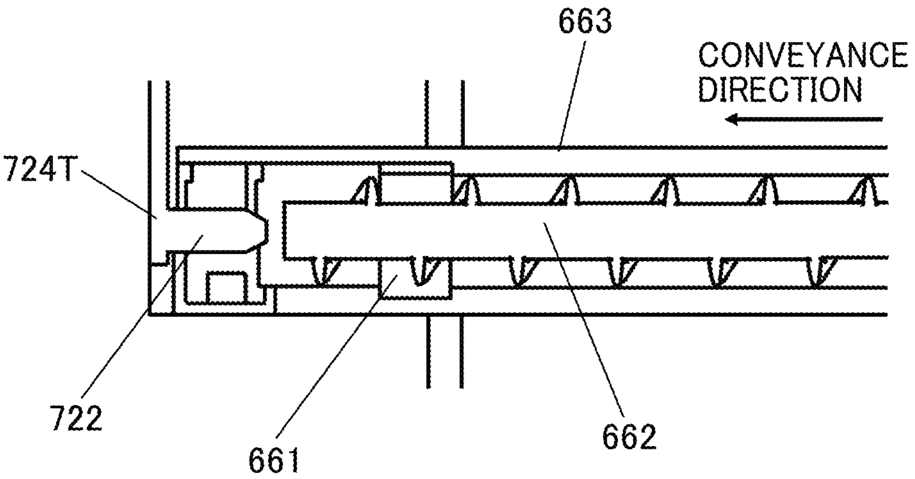

A description is given of a method for collecting residual toner with reference to FIGS. 7A to 7C. FIG. 7A is a diagram illustrating a configuration for conveying residual toner from a photoconductor unit. FIG. 7B is a cross-sectional view of the photoconductor unit, the waste-toner collection container 70, and a delivery section for residual toner. FIG. 7C is a diagram illustrating a positional relationship between the intermediate transfer cleaning unit 66 and the waste-toner collection container 70. FIG. 7D is a cross-sectional view of a delivery section of the intermediate transfer cleaning unit 66 and the waste-toner collection container 70. A description is given of a method for collecting residual toner of the black (K) color toner, as an example. The same applies to residual toners of other colors (cyan, magenta, and yellow).

Residual toner collected by the cleaning blade 23 described in FIG. 1 is conveyed toward a shutter 25 by the conveyor 24 of a delivery tube (FIG. 7A). When the waste-toner collection container 70 is set in the body of the image forming apparatus 10, a delivery tube that delivers residual toner from the photoconductor unit 20 to the waste-toner collection container 70 is installed in the hole 71K that is the delivery section of the waste-toner collection container 70 (FIG. 7B).

A projection holder 724 (724K, 724C, 724M, 724Y, or 724T) holds a projection 721 to press the shutter 25. When the waste-toner collection container 70 is installed, the projection 721, which is part of the case 72 of the waste-toner collection container 70, presses the shutter 25 of the photoconductor unit 20 to move the shutter 25. The conveyance paths of the photoconductor unit 20 and the waste-toner collection container 70 are connected. The residual toner conveyed from the conveyor 24 is accumulated in the waste-toner collection container 70. The sealing member 711 prevents toner from scattering from the photoconductor unit 20, the intermediate transfer cleaning unit 66, and the hole 71 (71K, 71C, 71M, 71Y, or 71T).

The residual toner of the intermediate transfer cleaning unit 66 is also collected by a similar method as in the photoconductor unit 20. A delivery tube 663 that delivers waste toner from the intermediate transfer cleaning unit 66 to the waste-toner collection container 70 is installed with the hole 71T of the waste-toner collection container 70 as a delivery section (FIG. 7C).

When the waste-toner collection container 70 is installed in the body of the image forming apparatus 10, a projection 722 on a projection holder 724T of the case 72 pushes a shutter 661 of the intermediate transfer cleaning unit 66. Thus, the shutter 661 moves, and then, the conveyance paths of the intermediate transfer cleaning unit 66 and the waste-toner collection container 70 are connected (FIG. 7D). As a result, the residual toner conveyed from a conveyor 662 is accumulated as waste toner in the waste-toner collection container 70.

Figure 8A:
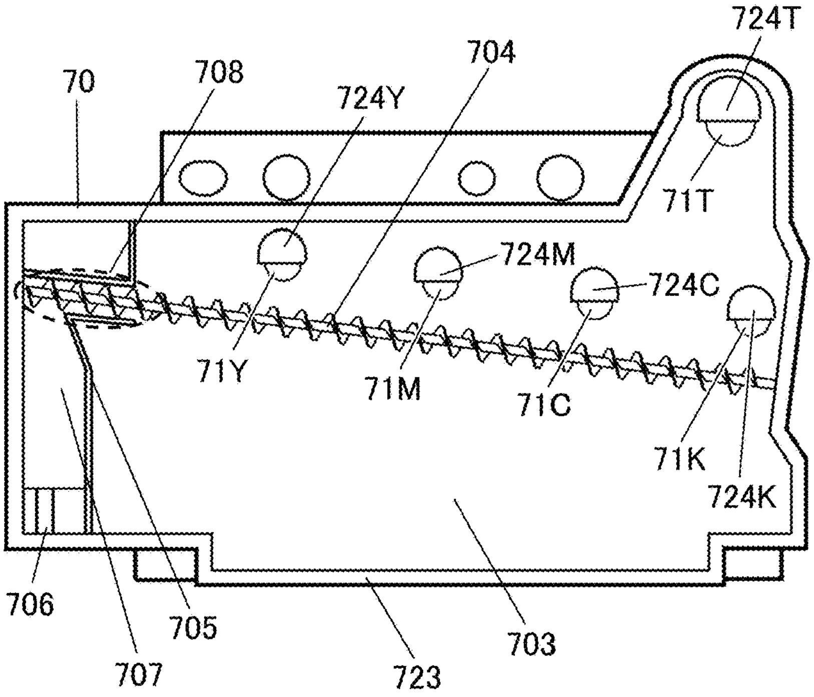
FIGS. 8A and 8B are diagrams illustrating the internal configuration of a waste-toner storage space of the waste-toner collection container of FIGS. 4A and 4B.
Figure 8B:
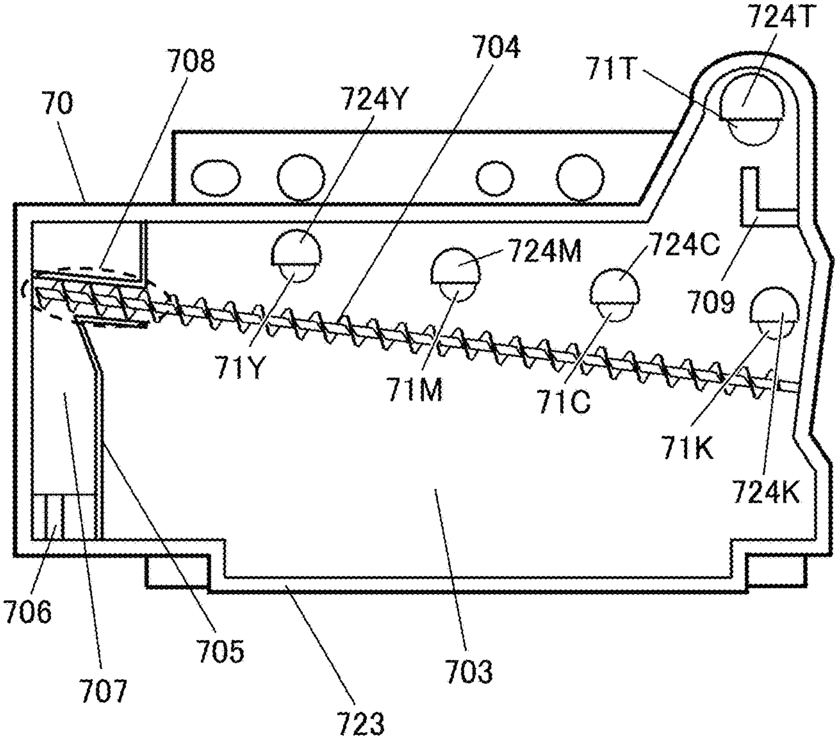

Details of the internal configuration of the waste-toner collection container 70 and a method for detecting the full-state of waste toner according to embodiments of the present disclosure are described with reference to FIGS. 8A and 8B. FIGS. 8A and 8B are illustrated with the film-shaped member 73 omitted. FIG. 8A is a diagram illustrating the internal configuration of the waste-toner storage space of the waste-toner collection container 70. A description is given of the internal configuration of the waste-toner collection container 70 with reference to FIG. 8A.

The waste-toner storage space is a space formed with the case 72 and the film-shaped member 73, which are walls as described above, for storing waste toner. This space is formed by bonding and sealing the film-shaped member 73 to an edge 723 of the case 72 formed of resin.

The waste-toner collection container 70 has the holes 71 as a plurality of inlet ports of residual toner. The projection holders 724K, 724C, 724M, 724Y, and 724T are arranged at positions corresponding to the holes 71. The projections 721 and 722 that open the shutters 25 and 661, respectively, disposed in the conveyance paths of residual toner are attached to the projection holders 724 (see FIGS. 7B and 7D). The hole 71 is a connecting portion with the intermediate transfer cleaning unit 66 and the photoconductor units 20. The residual toner is conveyed from the connecting portion into the waste-toner collection container 70.

A waste-toner screw 704 that is connected to and operates integrally with a drive connecting portion of the body of the image forming apparatus 10 to convey the conveyed residual toner in the waste-toner storage space. The waste-toner screw 704 is disposed at a position below the holes 71 as a plurality of waste-toner inlet ports when the waste-toner collection container 70 is attached to the exterior cover 12. The waste-toner screw 704 rotates during operation of the image forming apparatus 10.

A toner full-state detection sensor for detecting a state where the waste-toner collection container 70 is full of waste toner is disposed in the image forming apparatus 10. The toner full-state detection sensor is a transmission-type sensor. The light of the sensor passes through a toner full-state detection sensor transmission portion 706. The toner full-state detection sensor transmission portion 706 interrupts light when waste toner is accumulated, and then, notifies that waste toner has been accumulated in the waste-toner collection container 70. The toner full-state detection sensor is disposed to be lower than the lowest hole (the hole 71K in the present embodiment) of the holes 71 of the waste-toner inlet port when the waste-toner collection container 70 is attached to the exterior cover 12.

If the toner full-state detection sensor is positioned above the hole 71, the full-state of the waste toner cannot be detected even in a case that the waste toner is in full-state. The waste toner may overflow from the hole 71, through which the waste toner is stored, into the body of the image forming apparatus 10. Accordingly, the above-described configuration is adopted in order to prevent above-described failure.

In the present embodiment, the toner full-state detection sensor is disposed at a position lower than the waste-toner screw 704 by a specified distance in order to accumulate as much waste toner as possible in the waste-toner collection container 70.

In the present embodiment, the waste-toner storage space is divided into a plurality of spaces (rooms) by a partition 705. The waste-toner storage space includes a collection space 703, a detection space 707, and a screw arrangement space 708. The collection space 703 (an example of a second space) is a space for storing waste toner. The detection space 707 (an example of a first space) is a space in which the toner full-state detection sensor transmission portion 706 is disposed. The screw arrangement space 708 (an example of a third space, and a portion surrounded by a broken circle in FIG. 8) connects the collection space 703 and the detection space 707 and is a space in which the waste-toner screw 704 is disposed. For example, without the partition 705, the stored waste toner may accumulate near the toner full-state detection sensor transmission portion 706 and may lead to misdetection of full-state of waste toner. The partition 705 is disposed to prevent the above-described failure and enables storing of a large amount of waste toner.

The waste-toner collection container 70 is attached to the exterior cover 12, and the exterior cover 12 is opened and closed like a door. Accordingly, the waste toner stored in the waste-toner collection container 70 may be shaken, and the waste toner may move inside the storage space with the opening and closing operation. At this time, for example, toner in the collection space 703 may move to the detection space 707, which may lead to misdetection of full-state of waste toner. Accordingly, the waste toner is moved in the space from the screw arrangement space 708 in which the waste-toner screw 704 is disposed to prevent this erroneous detection of waste toner.

With such a configuration, in the present embodiment, the full-state of the waste toner is detected as follows.

The residual toner stored in the waste-toner collection container 70 is accumulated in the collection space 703. When the amount of waste toner has reached to the height of the waste-toner screw 704, the waste toner is conveyed to the detection space 707 via the screw arrangement space 708 in FIG. 8A. Then, the waste toner accumulates in the detection space 707.

When the waste toner in the detection space 707 has reached a specified amount, the light emitted from the toner full-state detection sensor is interrupted. Thus, the full-state of toner in the waste-toner collection container 70 is detected and a user is prompted to replace the waste-toner collection container 70.

FIG. 8B is a diagram illustrating another example of the internal configuration of the waste-toner storage space of the waste-toner collection container 70. The present embodiment is different from FIG. 8A in a point that a partition 709 is disposed below the hole 71T which is an inlet port of residual toner of the intermediate transfer cleaning unit 66. With such a configuration including the partition 709, residual toner is accumulated as waste toner in the space formed by the partition 70), and thus, a larger amount of the waste toner can be accumulated.

A description is given below of some features of embodiments of the present disclosure. Before describing such features, a configuration to be compared (a comparative example) is exemplified, and a description is given of disadvantages of the comparative example.

Comparative Example

For example, a configuration may be considered in which the waste-toner collection container 70 is covered with a plate-shaped member molded from resin to seal the waste-toner storage space. However, in such a case, since the plate-shaped member is molded from resin, a specified thickness may be required. The specified thickness may hinder the plate-shaped member from contributing to size reduction.

Alternatively, a method of molding a plate-shaped member with metal is also conceived. In this case, the thickness of the plate-shaped member can be reduced. However, such a configuration may need a mechanism for fixing the plate-shaped member as a cover to the waste-toner collection container 70 or the exterior cover 12. As a result, the configuration may be complicated. Further, a space for the mechanism is necessary, which is not desirable.

As another example, a method of forming a cover to cover only the space for storing waste toner is conceived. Also in this case, however, a mechanism for fixing the cover to the waste-toner collection container 70 or the exterior cover 12 may be needed. As a result, the configuration may be complicated. Further, a space for the mechanism is necessary, which is not desirable.

Figure 9:
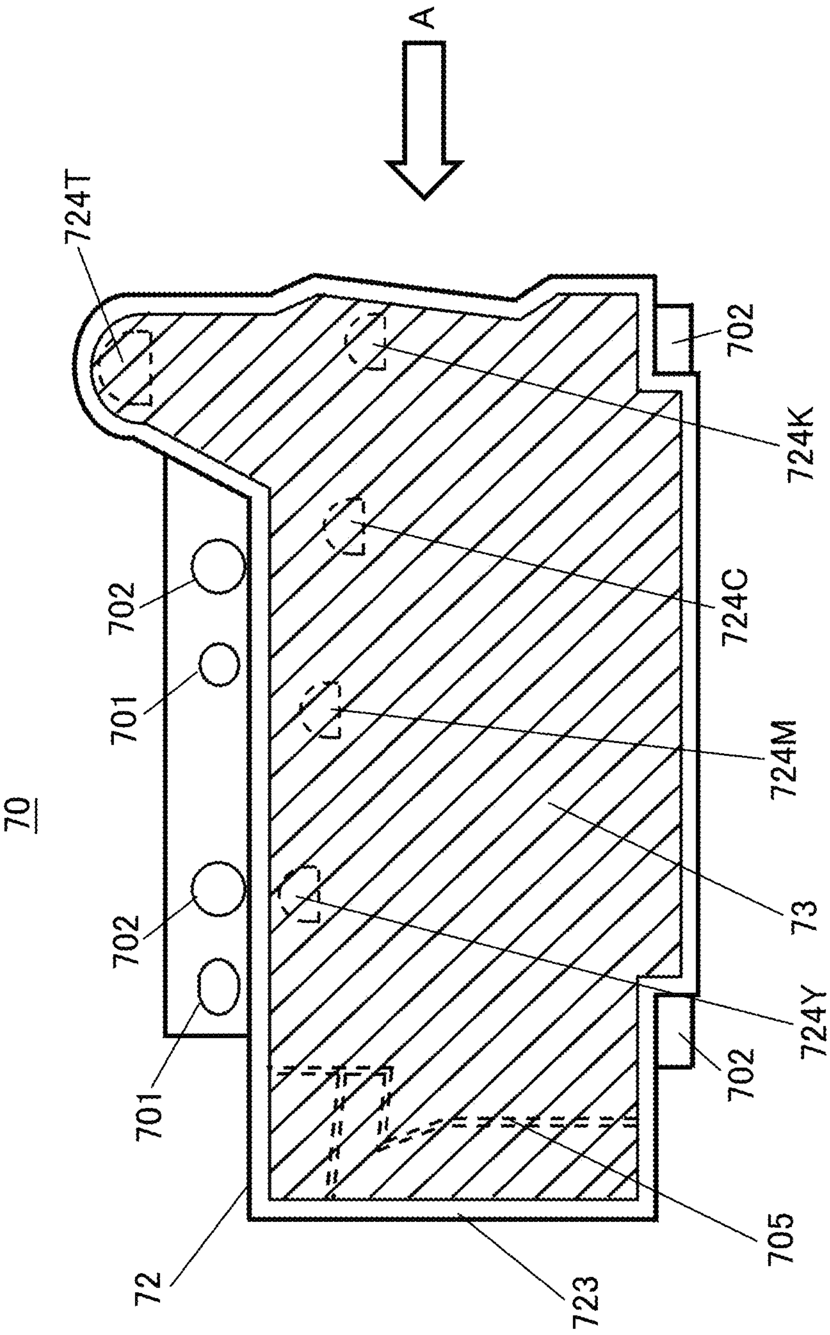
FIG. 9 is a diagram illustrating a configuration of the waste-toner collection container of FIG. 6B as viewed from a side on which a film-shaped member is attached.
Figure 10A:
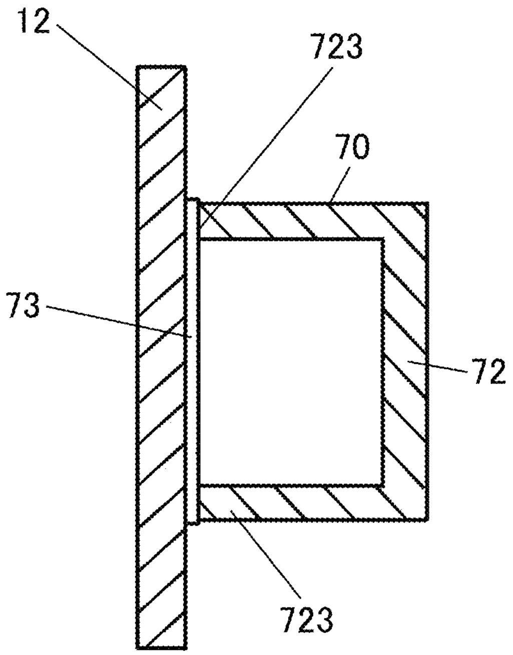
FIGS. 10A and 10B are cross-sectional views of a waste-toner collection container viewed from a lateral side of the waste-toner collection container, according to an embodiment of the present disclosure.

Accordingly, in an embodiment of the present disclosure, the following configuration is adopted to reduce the size of the waste-toner collection container 70. FIG. 9 is a diagram illustrating a configuration of the waste-toner collection container 70 according to the present embodiment, as viewed from the side on which the film-shaped member 73 is disposed. In the present embodiment, a part adjacent to the exterior cover 12 (a part facing the exterior cover 12 as a member to which the waste-toner collection container 70 is attached) in the walls forming the space for storing waste toner in the waste-toner collection container 70 is formed of the film-shaped member 73 as a film-shaped member. The thickness of the film-shaped member 73 is thinner than the thickness of any other wall in the walls forming the space for storing waste toner. The film-shaped member 73 is indicated by shaded hatching in FIG. 9. FIG. 10A is a cross-sectional view of the waste-toner collection container 70 as viewed from a lateral side of the waste-toner collection container 70 (as viewed from the direction indicated by arrow A in FIG. 9). The thickness of the film-shaped member 73 is thinner than the thickness of the edge 723 of the case 72.

The film-shaped member 73 in the present embodiment is formed of a transparent member. The present disclosure is not limited to this, and the film-shaped member 73 may be colored. Plastic is used as the material of the film-shaped member 73. The film-shaped member 73 has a thickness of about 0.1 mm.

The film-shaped member 73 is fused to the case 72 by application of heat, and thus, the waste toner stored in the case 72 can be sealed.

When the film-shaped member 73 is attached to the case 72, a method may be adopted in which, for example, a seal is applied to the edge 723 of the case 72, and the film-shaped member 73 is attached to a part where the seal is applied. However, in such a case, when the seal is detached from a release sheet and attached to the edge 723 of the case 72, the seal may adhere to an operator's hand or an unintended position. In addition, the thickness of the portion where the seal is attached increases by the thickness of the seal. As a result, the attachment of the film-shaped member 73 by heat fusion can enhance workability and reduce thickness.

The attachment of the film-shaped member 73 by heat fusion is also performed on the partition 705. If the film-shaped member 73 is not attached to the partition 705, a gap may be formed between the partition 705 and the film-shaped member 73. Thus, waste toner may move from the gap. In other words, waste toner may move from the collection space 703 to the detection space 707. Accordingly, the above-described configuration is adopted to prevent the above-described failure.

Figure 10B:
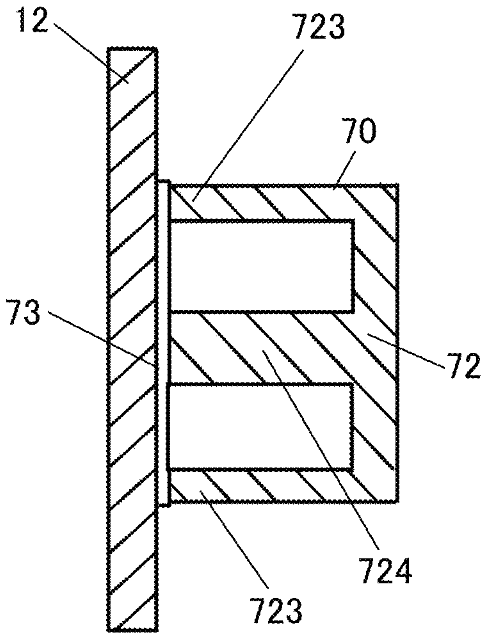

A description is given of an example in which the number of parts to be subjected to heat fusion is increased in order to increase the attaching force to the case 72. Specifically, the film-shaped member 73 thermally fuses not only the edge 723 of the case 72 but also the partition 705 and the partition 709, which is another partition, and the projection holders 724 provided with the projections 721 and 722. FIG. 10B is a cross-sectional view of the waste-toner collection container 70 as viewed from a latent side of the waste-toner collection container 70 (as viewed from the arrow A in FIG. 9). FIG. 10B illustrates an example of a configuration in which a film-shaped member 73 is attached to the projection holder 724. With such a configuration, the film-shaped member 73 is strongly attached to the case 72. Thus, the sealing force of waste toner can be increased.

The waste-toner collection container 70 is formed of the above-described configuration and is attached to the exterior cover 12. The waste-toner collection container 70 is attached to the exterior cover 12 in a state where a portion of the waste-toner collection container 70 on a film side on which the film-shaped member 73 is disposed faces the inner surface of the exterior cover 12. Such a configuration can contribute to the size reduction of the waste-toner collection container 70.

The area of a portion of the exterior cover 12 facing the film-shaped member 73 is larger than the area of the film-shaped member 73.

The portion of the waste-toner collection container 70 on the film side is positioned on the side facing the exterior cover 12. Accordingly, after the waste-toner collection container 70 is attached to the exterior cover 12, the waste-toner collection container 70 is covered with the exterior cover 12 having a larger area than the film-shaped member 73. Thus, the state where waste toner is stored in the waste-toner collection container 70 is not visible to a user. As a result, a failure can be prevented that a user carelessly touches the film-shaped member 73 to break the film-shaped member 73 and cause spilling of waste toner.

In the present embodiment, the waste-toner collection container 70 is formed of the film-shaped member 73 having such a small thickness, and thus, the thickness of the waste-toner collection container 70 itself can be reduced as much as possible. As a result, the size of the waste-toner collection container 70 can be reduced, and a slight space in the image forming apparatus 10 can be effectively utilized as an installation space. The side of the waste-toner collection container 70 facing the film-shaped member 73 is attached to the exterior cover 12, so that the strength of the side of the waste-toner collection container 70 that is protected by the exterior cover 12 is not required so much. As a result, the waste-toner collection container 70 can contribute to size reduction and weight reduction while retaining a capacity to store waste toner.

Using the film-shaped member 73 can obviate the need to integrally mold the exterior cover 12 and the waste-toner collection container 70. The waste-toner collection container 70 is separated from the exterior cover 12. As a result, only the waste-toner collection container 70 needs to be replaced, and the number of replacement components can be further reduced.

In addition, the attachment of the waste-toner collection container 70 to the exterior cover 12 and the bonding for sealing waste toner are performed on the surface by the film-shaped member 73. Thus, the enhancement of workability is expected with above-described configuration. Since the exterior cover 12 and waste toner do not contact with each other, an effect can also be obtained that the exterior cover 12 can be prevented from being stained.

Figure 11B:
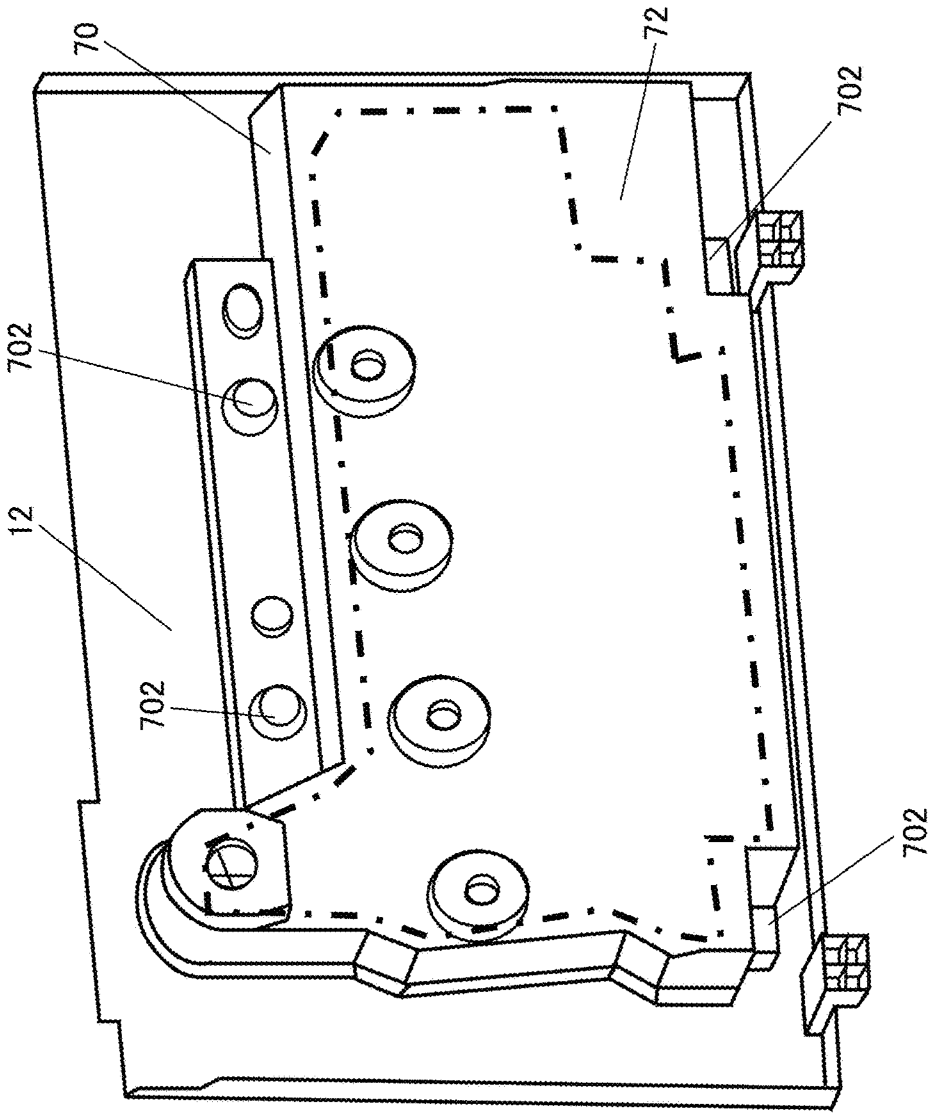
Figure 11A:
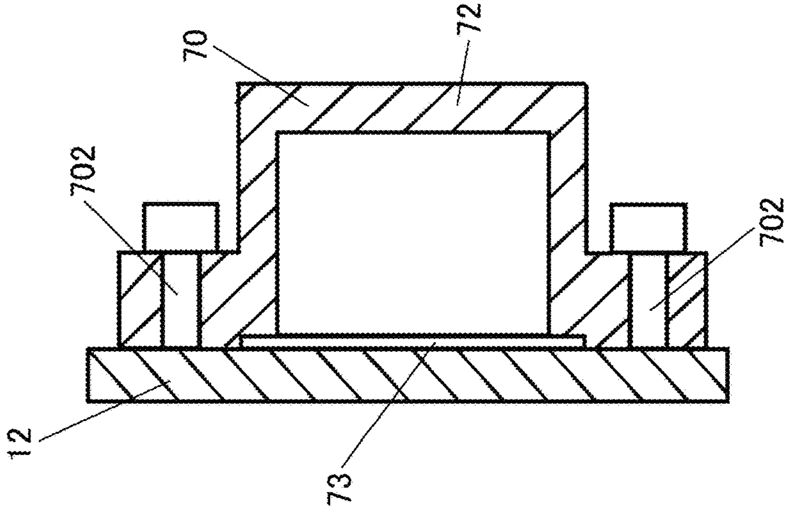

The waste-toner collection container 70 is fixed to the exterior cover 12 with screws for attachment of the waste-toner collection container 70 according to the present embodiment. FIG. 11A is a diagram illustrating a state where the waste-toner collection container 70 is attached to the exterior cover 12. FIG. 11B is a perspective view of a position of the fastener 702 of the waste-toner collection container 70. As a specific attachment method, fastening is performed by screwing in the screw holes 124 formed in the exterior cover 12 at the fasteners 702 as described above. At this time, a load is applied to the waste-toner collection container 70 by a fastening force when screws are fastened. When the load is applied to a storage space that is a waste-toner storage region, the film-shaped member 73 may be damaged. Accordingly, in the present embodiment, the fasteners 702 are disposed outside the storage space (a portion surrounded by a one-dot chain line in FIG. 11B) in order to avoid application of a load to the film-shaped member 73.

Figure 12A:
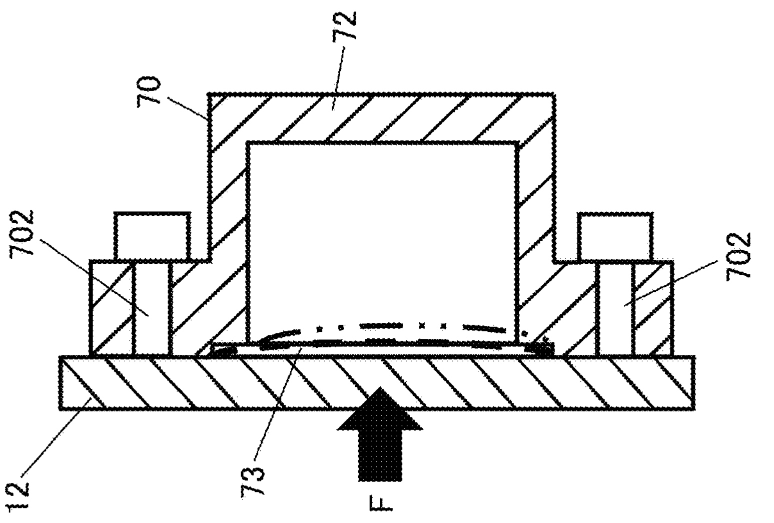
FIGS. 12A to 12C are diagrams illustrating deformation force of an exterior cover.
Figure 12B:
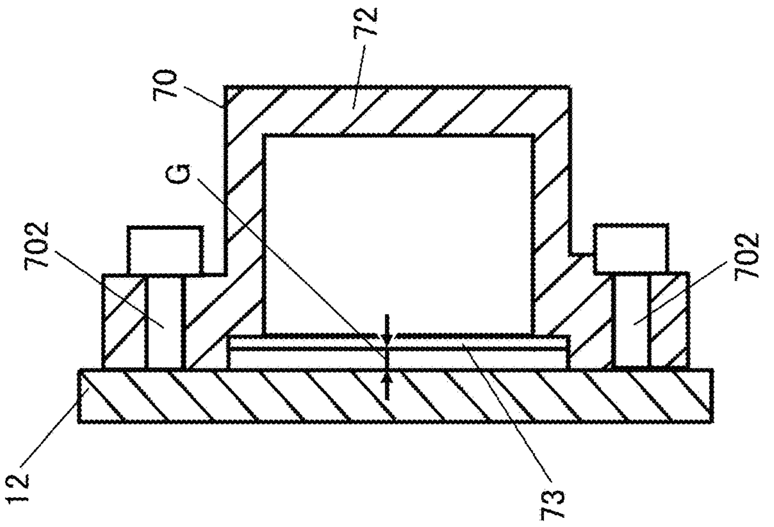
Figure 12C:
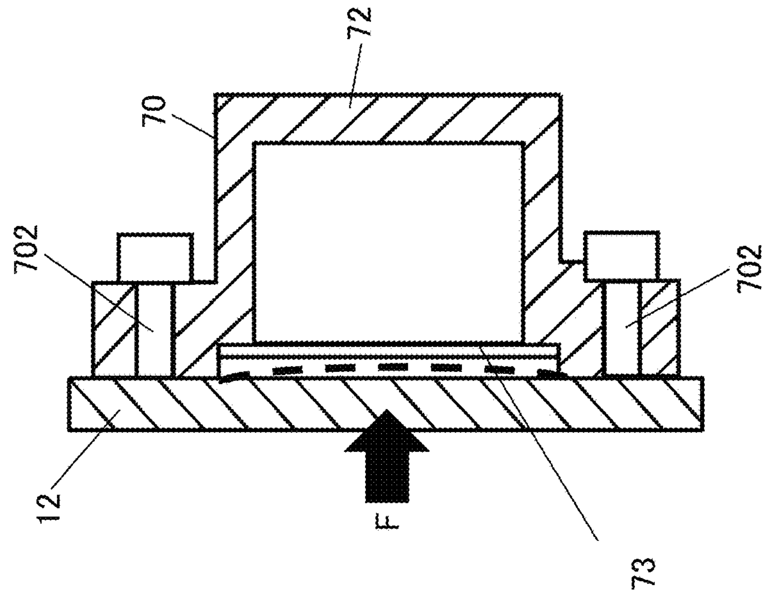

The exterior cover 12 may be temporarily deformed, and then, this deforming force F may apply a load to the film-shaped member 73. FIGS. 12A to 12C are diagrams for explaining a deforming force of the exterior cover 12. In FIG. 12A, a broken line represents deformation of the exterior cover 12, and a two-dot chain line represents deformation of the film-shaped member 73. Accordingly, the film-shaped member 73 is stuck to the case 72, considering that this load is not applied in order to avoid being affected by the above-described deforming force. At this time, as illustrated in FIG. 12B, a gap G may be formed in advance between the exterior cover 12 and the film-shaped member 73. The gap G is an example of a specified gap. If the gap G between the exterior cover 12 and the film-shaped member 73 is too large, a space turns to be larger. As a result, this configuration does not contribute to the size reduction of the waste-toner collection container 70. For this reason, in the present embodiment, the gap G is set to about 5 mm. With such a configuration, as illustrated in FIG. 12C, even if the deforming force F is applied, the gap G prevents the deforming force F from affecting the film-shaped member 73. As a result, damage of the film-shaped member 73 can be prevented.

The present embodiment exemplifies a configuration in which the waste-toner collection container 70 is provided with the film-shaped member 73. However the present disclosure is not limited thereto. If molding is possible, a part of the housing of the waste-toner collection container 70 facing the exterior cover 12 may be reduced in thickness. For example, instead of the film-shaped member 73, a thin resin part may be used and molded integrally with the case 72.

Figure 13C:
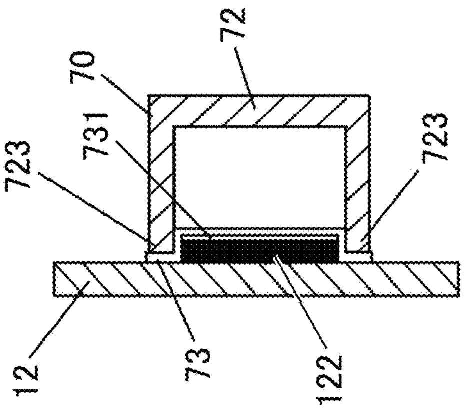
FIGS. 13A to 13C are diagrams illustrating a configuration of an exterior cover according to another embodiment of the present disclosure.
Figure 13B:
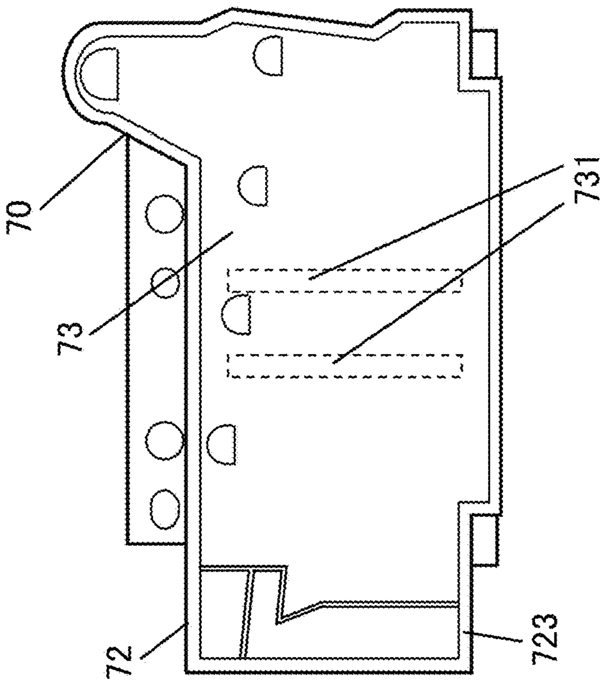
Figure 13A:
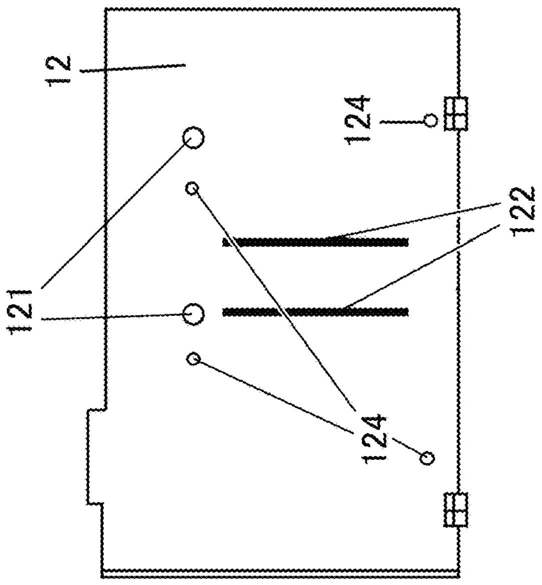

A description is given of another embodiment (modification) according to the present disclosure. FIG. 13A is a diagram illustrating a configuration in which the exterior cover 12 are provided with ribs. FIG. 13B is a diagram illustrating a configuration in which the film-shaped member 73 is provided with a recessed shape for avoiding ribs. FIG. 13C is a cross-sectional view of a configuration in which a recessed shape for avoiding a rib is formed in the film-shaped member 73.

As illustrated in FIG. 13A, ribs 122 (an example of convex portions at a mount part) may be disposed on the inside (the side on which the waste-toner collection container 70 is attached) of the exterior cover 12 in order to ensure the strength of the exterior cover 12. In that case, a convex shape is formed on the inside of the exterior cover 12. At this time, when the ribs 122 are disposed in the attachment surface of the waste-toner collection container 70, the ribs 122 apply pressure to the film-shaped member 73. Thus, the film-shaped member 73 is pressed by the ribs 122, and recessed portions are formed on the film-shaped member 73. The recessed portions may make an operation difficult in a case where heat fusion of the film is performed. The pressure may cause damage to the film-shaped member 73 in some cases. In such a case, the film-shaped member 73 may not deal with such a failure in a case where the film-shaped member 73 is a sheet-shaped member formed in a flat shape.

To deal with the above-described failure, the film-shaped member 73 has a configuration to avoid application of pressure from the ribs 122. On the other hand, it is preferable to minimize the reduction in the collection capacity of the waste-toner collection container 70.

As illustrated in FIG. 13B, a configuration is adopted in which recesses 731 (the broken lines in FIG. 13B) are formed to correspond to the ribs 122 of the exterior cover 12 in a part of an attachment surface of the film-shaped member 73 on the side facing the exterior cover 12. The recess 731 is an example of a recessed portion. The size of the recess 731 is set not to receive the pressure of the rib 122 in consideration of the collection capacity of waste toner. With such a configuration, since the ribs 122 are engaged with the recesses 731 as illustrated in FIG. 13C, pressure from the ribs 122 is not applied to the film-shaped member 73. Accordingly, damage of the film-shaped member 73 can be prevented. As a result, the waste-toner collection container 70 can also be attached without a large reduction in the collection capacity of the waste-toner collection container 70 while the strength of the exterior cover 12 is ensured.

Figure 14A:
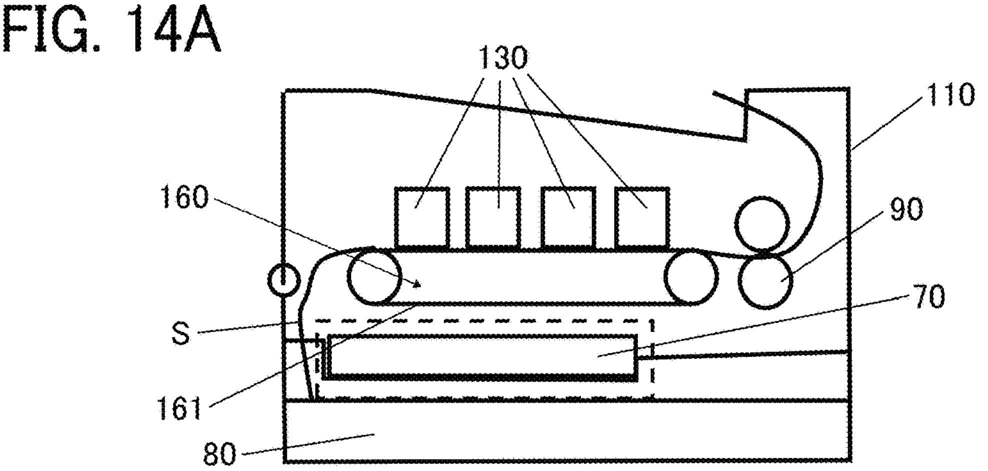
FIGS. 14A to 14C are diagrams illustrating a configuration of an image forming apparatus according to still another embodiment of the present disclosure.
Figure 14B:
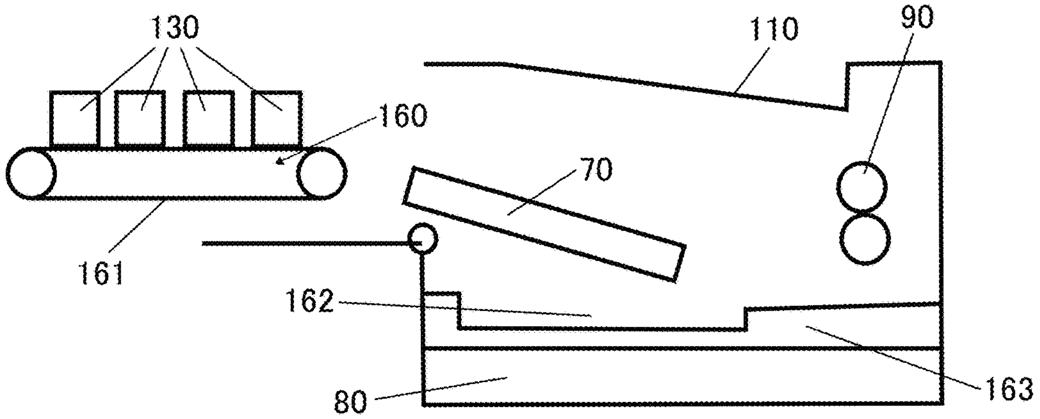
Figure 14C:
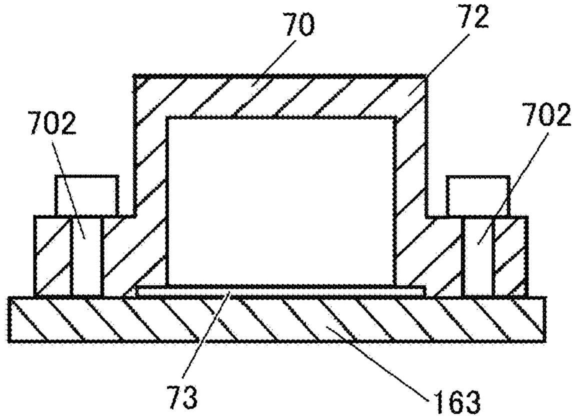

A description is given of an image forming apparatus according to another modification of the present disclosure. FIG. 1A illustrates the configuration of an image forming apparatus according to another embodiment of the present disclosure. FIG. 14B is a diagram illustrating a state where a transfer unit is removed from an image forming apparatus according to another embodiment of the present disclosure. FIG. 14C is a diagram illustrating a configuration in which the waste-toner collection container 70 is attached to an image forming apparatus according to another embodiment of the present disclosure.

An image forming apparatus 110 according to the present embodiment does not include an intermediate transfer unit, but includes a transfer unit 160 instead, and adopts a configuration in which a toner image formed on a photoconductor unit 130 is transferred directly to the sheet S. A so-called direct transfer system is adopted. The image forming apparatus 110 is an example of an apparatus.

The image forming apparatus 110 according to the present embodiment has substantially the same configuration as the image forming apparatus 10 except for the transfer unit 160.

The transfer unit 160 is attachable to a body of the image forming apparatus 110. As illustrated in FIG. 14A, the transfer unit 160 is located below a plurality of photoconductor units 130 when the plurality of photoconductor units 130 are located at internal positions of the image forming apparatus 110 in a state where the transfer unit 160 is attached to the body of the image forming apparatus 110. The transfer unit 160 includes a belt 161. In other words, the image forming apparatus 10 includes the belt 161. The belt 161 contacts photoconductors included in the plurality of photoconductor units 130, when the plurality of photoconductor units 130 are located at the internal positions of the image forming apparatus 110 in the state where the transfer unit 160 is attached to the body of the image forming apparatus 110.

The belt 161 conveys a sheet S supplied from the sheet feeder 80 toward the fixing unit 90. The transfer unit 160 transfers toner images from the plurality of photoconductors onto a sheet S conveyed by the belt 161 when the sheet S contacts the plurality of photoconductors in turn.

In the present embodiment, a space 162 is formed below the transfer unit 160. As illustrated in FIG. 14B, the waste-toner collection container 70 is removably attached in the space 162.

The waste-toner collection container 70 is disposed such that a portion of the waste-toner collection container 70 at which the film-shaped member 73 is disposed faces a bottom 163 of the image forming apparatus 110 serving as an attachment surface. The bottom 163 is an example of the mount part (the part to and from which the powder collection container is to be attached and detached. The area of a portion of the bottom 163 facing the film-shaped member 73 is larger than the area of the film-shaped member 73. The waste-toner collection container 70 is fastened with screws to the bottom 163 as illustrated in FIG. 14C. Attachment and detachment operations of the waste-toner collection container 70 are performed after the photoconductor unit 130 and the transfer unit 160 are removed from a body cover of the image forming apparatus 110.

The space 162 below the transfer unit 160 may be a limited space due to the downsizing of the image forming apparatus 110. Accordingly, since the waste-toner collection container 70 according to the present embodiment has a container portion formed by the film-shaped member 73, the thickness can be restricted. Thus, the slight space can be effectively utilized.

Since the film-shaped member 73 is attached to face the bottom 163, the state where waste toner is accumulated in the waste-toner collection container 70 from the film-shaped member 73 is not visible for the user.

The attachment and detachment operations of the waste-toner collection container 70 in a small space inside the image forming apparatus 110 may not be easily performed for reasons such as difficulty in securing visibility. However, the waste-toner collection container 70 according to the present embodiment can be easily installed in the image forming apparatus 110 by screwing. Thus, enhancement in workability is expected.

Embodiments of the present disclosure have been described with respect to the case where the powder container is a waste-toner collection container. However, the present disclosure is not limited thereto, and is applicable to containers that store other types of powder.

In addition, the storage space for storing powder in the powder container is not limited to a rectangular shape, and for example, a wall forming the storage space may have a rounded shape, or the storage space may have an elliptical shape.

The above-described embodiments and modification are examples. Embodiments of the present disclosure can provide, for example, some advantages in the following aspects.

First Aspect

In a first aspect, a powder collection container (e.g., the waste-toner collection container 70) to be attachable to and detachable from a mount part (e.g., the exterior cover 12 and the bottom 163) of an apparatus (e.g., the image forming apparatus 10 and the image forming apparatus 110) and store powder (e.g., waste toner) includes a plurality of walls that form a storage space to store the powder. The plurality of walls include a first wall (e.g., the film-shaped member 73) and a second wall (e.g., the case 72). The first wall is a wall to face the mount part of the apparatus. The second wall is a wall not to face the mount part of the apparatus. A thickness of the first wall is smaller than a thickness of the second wall.

According to the first aspect, the size of the powder collection container can be reduced.

Second Aspect

In a second aspect, in the powder collection container (e.g., the waste-toner collection container 70) according to the first aspect, the first wall (e.g., the film-shaped member 73) and the second wall (e.g., the case 72) are different components.

According to the second aspect, workability in replacement can be enhanced.

Third Aspect

In a third aspect, in the powder collection container (e.g., the waste-toner collection container 70) according to the second aspect, the first wall is a film (e.g., the film-shaped member 73).

According to the third aspect, the size of the powder collection container (e.g., the waste-toner collection container 70) can be reduced.

Fourth Aspect

In a fourth aspect, in the powder collection container (e.g., the waste-toner collection container 70) according to the third aspect, the film (e.g., the film-shaped member 73) is a member that is attachable to the powder collection container (e.g., the waste-toner collection container 70) by application of heat to the second wall (e.g., the case 72), for example, thermal fusion bonding.

According to the fourth aspect, workability in replacement can be enhanced, and the thickness of the powder collection container can be reduced.

Fifth Aspect

In a fifth aspect, in the powder collection container (e.g., the waste-toner collection container 70) according to the first aspect, the first wall (e.g., the film-shaped member 73) and the second wall (e.g., the case 72) are molded together as a housing.

According to the fifth aspect, workability in replacement can be enhanced.

Sixth Aspect

In a sixth aspect, in the powder collection container (e.g., the waste-toner collection container 70) according to any one of the first to fifth aspects, the second wall (e.g., the case 72) is made of resin.

According to the sixth aspect, the replacement operation can be simplified.

Seventh Aspect

In a seventh aspect, the powder collection container (e.g., the waste-toner collection container 70) according to any one of the first to sixth aspects further includes an attaching member (e.g., the fastener 702) for attaching the powder collection container to and detaching the powder collection container from the mount part (e.g., the exterior cover 12 and the bottom 163).

According to the seventh aspect, the powder collection container can be easily attached to and detached from the mount part.

Eighth Aspect

In an eighth aspect, in the powder collection container (e.g., the waste-toner collection container 70) according to the seventh aspect, the attaching member (e.g., the fastener 702) is disposed at a portion outside the storing space in the powder collection container.

According to the eighth aspect, in a case where the powder collection container is attached to and detached from the mount part, application of loading to the first wall (e.g., the film-shaped member 73) can be avoided and damage of the powder collection container (e.g., the waste-toner collection container 70) can be prevented.

Ninth Aspect

In a ninth aspect, in the powder collection container (e.g., the waste-toner collection container 70) according to the third or fourth aspect, the first wall (e.g., the film-shaped member 73) includes a recess (e.g., the recess 731) at a position corresponding to a convex (e.g., the rib 122) formed at the mount part (e.g., the exterior cover 12 and the bottom 163). The convex fits into the recess.

According to the ninth aspect, application of a pressure from the convex to the first wall can be avoided and damage can be prevented while maintaining the strength of the mount part.

Tenth Aspect

In a tenth aspect, in the powder collection container (e.g., the waste-toner collection container 70) according to any one of the first to ninth aspects, the storage space includes a first space (e.g., the detection space 707), a second space (e.g., the collection space 703), a third space (e.g., the screw arrangement space 708), and a powder conveyor (e.g., the waste-toner screw 704). The first space corresponds to a position of a powder detector disposed in the apparatus (e.g., the image forming apparatus 10 and the image forming apparatus 110) to detect powder. The second space (e.g., a collection space 703) is provided with an inlet port (e.g., the hole 71) for receiving the powder into the powder collection container and is partitioned from the first space. The third space connects the first space and the second space. The powder conveyor is disposed in the third space.

According to the tenth aspect, erroneous detection of full-state of the powder can be prevented.

Eleventh Aspect

In an eleventh aspect, in the powder collection container (e.g., the waste-toner collection container 70) according to any one of the first to tenth aspects, the powder is waste toner cleaned and collected in an electrophotographic image forming apparatus.

According to the eleventh aspect, the present disclosure can be applied to the electrophotographic image forming apparatus.

Twelfth Aspect

In a twelfth aspect, the apparatus (e.g., the image forming apparatus 10 and the image forming apparatus 110) includes the powder collection container (e.g., the waste-toner collection container 70) according to any one of the first to eleventh aspects and includes the mount part (e.g., the exterior cover 12 and the bottom 163) to and from which the powder collection container (e.g., the waste-toner collection container 70) is attached and detached.

According to the twelfth aspect, the size of the powder collection container can be reduced and the number of replacement parts for the powder collection container can be reduced.

Thirteenth Aspect

In a thirteenth aspect, the apparatus (e.g., the image forming apparatus 10 and the image forming apparatus 110) according to the twelfth aspect, the mount part (e.g., the exterior cover 12 and the bottom 163) is an exterior of the apparatus and is an exterior cover (e.g., the exterior cover 12) that is openable and closable.

According to the thirteenth aspect, the powder collection container (e.g., the waste-toner collection container 70) can be disposed in a small space of the apparatus and the limited space can be effectively utilized.

Fourteenth Aspect

In a fourteenth aspect, in the apparatus (e.g., the image forming apparatus 10 and the image forming apparatus 110) according to the twelfth or thirteenth aspect, an area of the mount part (e.g., the exterior cover 12 and the bottom 163) is larger than an area of the first wall (e.g., the film-shaped member 73).

According to the fourteenth aspect, a failure that a user inadvertently touches the first wall, and then, the first wall is broken to spill the powder can be prevented.

Fifteenth Aspect

In a fifteenth aspect, in the apparatus (e.g., the image forming apparatus 10 and the image forming apparatus 110) according to any one of the eleventh to fourteenth aspects, a specified gap (e.g., the gap G) is disposed between the mount part (e.g., the exterior cover 12 and the bottom 163) and the first wall (e.g., the film-shaped member 73).

According to the fifteenth aspect, application of loading to the first wall can be avoided and damage of the first wall can be prevented.

Sixteenth Aspect

In a sixteenth aspect, in the apparatus (e.g., the image forming apparatus 10 and the image forming apparatus 110) according to the twelfth aspect, the mount part (e.g., the exterior cover 12 and the bottom 163) is a bottom (e.g., the bottom 163) of an inside of the apparatus.

According to the sixteenth aspect, the powder collection container (e.g., the waste-toner collection container 70) can be disposed in a small space of the apparatus and the limited space can be effectively utilized.

Seventeenth Aspect

In a seventeenth aspect, the apparatus (e.g., the image forming apparatus 10 and the image forming apparatus 110) according to the tenth aspect includes a plurality of inlet ports including the inlet port to receive powder. the powder detector (e.g., the toner full-state detection sensor) is disposed at a position lower than a lowest inlet port (e.g., the hole 71) of the plurality of inlet ports, in a state where the powder collection container (e.g., the waste-toner collection container 70) is attached to the mount part (e.g., the exterior cover 12 and the bottom 163).

According to the seventeenth aspect, overflowing of the powder from the portion storing the powder to a body of the apparatus can be prevented.

Eighteenth Aspect

In an eighteenth aspect, the apparatus (e.g., the image forming apparatus 10 and the image forming apparatus 110) is an electrophotographic image forming apparatus and includes the powder collection container (e.g., the waste-toner collection container 70) according to any one of the first to tenth aspects.

According to the eighteenth aspect, the present disclosure can be applied to an electrophotographic image forming apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An apparatus, comprising:

an exterior cover to open and close, the exterior cover being a mount part of the apparatus; and a powder collection container to be attachable to and detachable from the exterior cover, to store powder, the powder collection container including:

a plurality of walls that form a storage space to store the powder, the plurality of walls including:

a first wall to face the exterior cover; and a second wall not to face the exterior cover, wherein a thickness of the first wall is smaller than a thickness of the second wall.

2. The apparatus according to claim 1, wherein the first wall and the second wall are different components.

3. The apparatus according to claim 2, wherein the first wall is a film.

4. The apparatus according to claim 3, wherein the film is a member attached to the powder collection container by application of heat to the second wall.

5. The apparatus according to claim 1, wherein the first wall and the second wall are molded together as a housing.

6. The apparatus according to claim 1, wherein the second wall comprises resin.

7. The apparatus according to claim 1, further comprising: a fastener to detachably attach the powder collection container to the mount part.

8. The apparatus according to claim 7, wherein the fastener is disposed at a portion outside the storage space in the powder collection container.

9. The apparatus according to claim 1, wherein the first wall has a recess at a position corresponding to a convex portion of the mount part, and wherein the convex portion fits into the recess.

10. The apparatus according to claim 1, wherein the storage space includes:

a first space that corresponds to a position of a powder detector disposed in the apparatus;

a second space provided with an inlet port to receive the powder into the powder collection container, the second space partitioned from the first space;

a third space connecting the first space and the second space; and a powder conveyor disposed in the third space.

11. The apparatus according to claim 10, further comprising:

a plurality of inlet ports including the inlet port to receive the powder, wherein the powder detector is disposed at a position lower than a lowest inlet port of the plurality of inlet ports, in a state where the powder collection container is attached to the mount part.

12. The apparatus according to claim 1, wherein the powder is waste toner cleaned and collected in an electrophotographic image forming apparatus.

13. The apparatus according to claim 1, wherein an area of the mount part is larger than an area of the first wall.

14. The apparatus according to claim 1, wherein the mount part is disposed with a specified gap from the first wall.

15. The apparatus according to claim 1, wherein the mount part is an internal bottom of the apparatus.

16. The apparatus comprising according to claim 1, wherein:

the apparatus is an electrophotographic image forming apparatus.

* * * * *